(12) United States Patent
Zhang et al.

(10) Patent No.: US 9,928,210 B1
(45) Date of Patent: Mar. 27, 2018

(54) CONSTRAINED BACKUP IMAGE DEFRAGMENTATION OPTIMIZATION WITHIN DEDUPLICATION SYSTEM

(75) Inventors: Xianbo Zhang, Madison, WI (US); Benjamin Potvien, Andover, MN (US); Thomas Hartnett, Saint Paul, MN (US); Weibao Wu, Vadnais Heights, MN (US); Satyajit Gorhe Parlikar, Shoreview, MN (US)

(73) Assignee: Veritas Technologies LLC, Mountain View, CA (US)

( * ) Notice: Subject to any disclaimer, the term of this patent is extended or adjusted under 35 U.S.C. 154(b) by 282 days.

(21) Appl. No.: 13/459,987

(22) Filed: Apr. 30, 2012

(51) Int. Cl.
*G06F 12/00* (2006.01)
*G06F 15/80* (2006.01)

(52) U.S. Cl.
CPC ................................ *G06F 15/8084* (2013.01)

(58) Field of Classification Search
CPC ....... G06F 3/067; G06F 15/04; G06F 15/8084
USPC ........................................................ 711/165
See application file for complete search history.

(56) References Cited

U.S. PATENT DOCUMENTS

| | | | |
|---|---|---|---|
| 8,041,907 B1* | 10/2011 | Wu et al. ...................... | 711/161 |
| 8,266,430 B1* | 9/2012 | Lumb ........................... | 713/165 |
| 8,484,427 B1* | 7/2013 | Goldobin et al. ............ | 711/162 |
| 2008/0229037 A1* | 9/2008 | Bunte et al. .................. | 711/162 |
| 2008/0270461 A1* | 10/2008 | Gordon ................. | G06F 3/0608 |
| 2009/0300318 A1* | 12/2009 | Allen et al. .................. | 711/206 |
| 2011/0040951 A1* | 2/2011 | Akirav et al. .................... | 712/4 |
| 2012/0131025 A1* | 5/2012 | Cheung ............. | G06F 17/30159 |
| | | | 707/755 |
| 2012/0159098 A1* | 6/2012 | Cheung ............... | G06F 12/0261 |
| | | | 711/162 |

OTHER PUBLICATIONS

Youngjin Nam et al., "Chunk Fragmentation Level: An Effective Indicator for Read Performance Degradation in Deduplication Storage", IEEE International Conference on High Performance Computing and Communications, 2011.*
Youngjin Nam et al., "Chunk Fragmentation Level: An Effective Indicator for Read Performance Degradation in Deduplication Storage," 2011 IEEE International Conference on High Performance Computing and Communications, pp. 581-586.

* cited by examiner

*Primary Examiner* — Ryan Bertram
*Assistant Examiner* — Trang K Ta
(74) *Attorney, Agent, or Firm* — Campbell Stephenson LLP

(57) ABSTRACT

The present disclosure provides for defragmenting deduplicated data, such as one or more backup image files, stored in a deduplicated data store. A defragmentation module can be implemented on a deduplication server to reduce fragmentation of backup images and improve processing time for restoring a backup image. A defragmentation module can be configured to defragment a backup image file by migrating portions of data of the backup image file that are stored in various containers at non-contiguous locations throughout deduplicated data store. A defragmentation module can contiguously write the portions to one or more containers, which are stored at one or more new locations in the deduplicated data store. A defragmentation module can be configured to evaluate whether portions of a backup image file meet criteria for defragmentation. A defragmentation module can also be configured to update location information about the portions that are migrated to the new container(s).

17 Claims, 9 Drawing Sheets

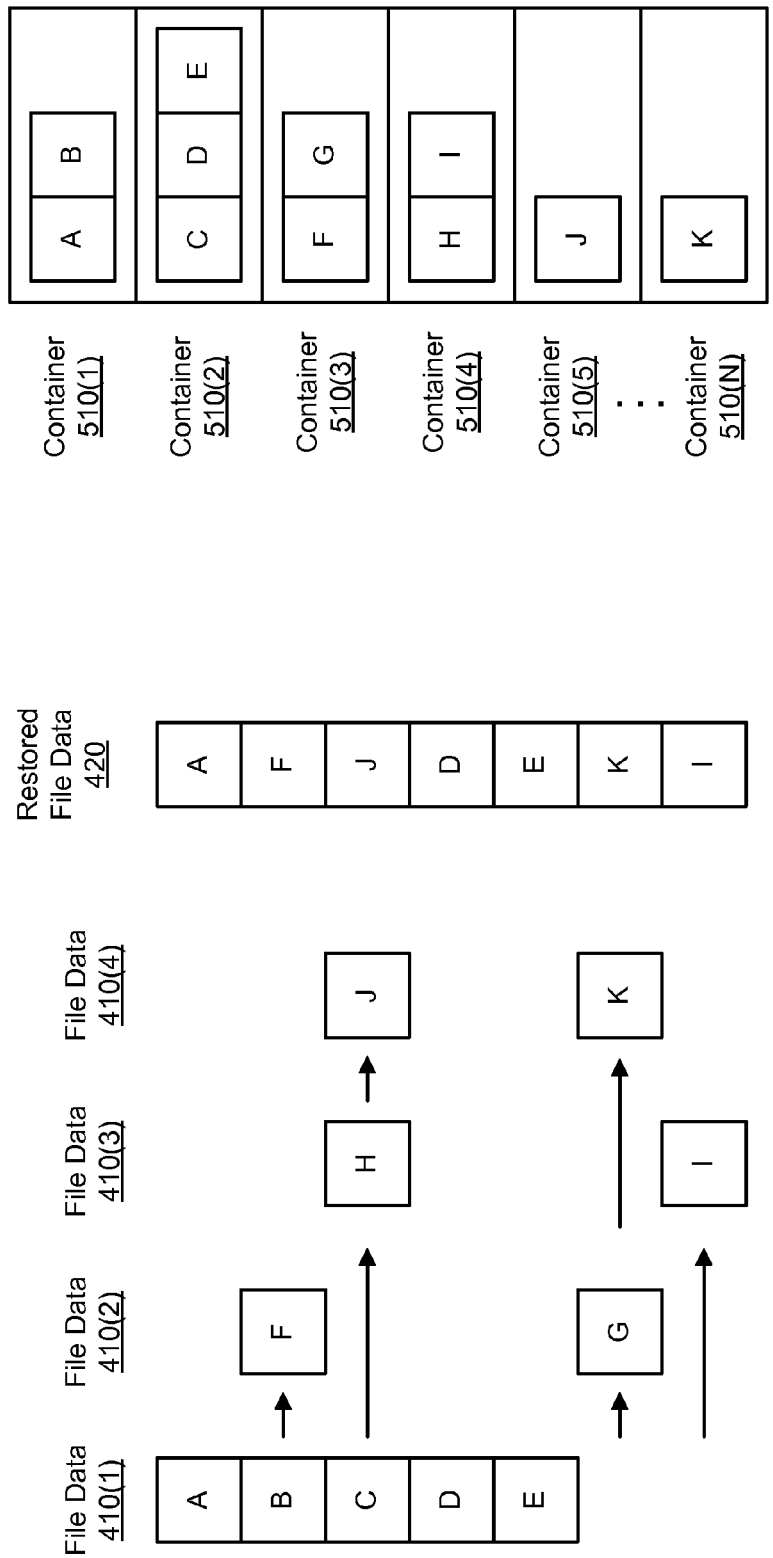

CONSTRAINED BACKUP IMAGE DEFRAGMENTATION OPTIMIZATION WITHIN DEDUPLICATION SYSTEM

FIELD OF THE INVENTION

The present invention relates to defragmentation of data storage and, more particularly, to performing defragmentation of deduplicated data in a deduplicated data store.

DESCRIPTION OF THE RELATED ART

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

SUMMARY OF THE INVENTION

The present disclosure provides for defragmenting deduplicated data, such as one or more backup image files, stored in a deduplicated data store. A defragmentation module can be implemented on a deduplication server to reduce fragmentation of backup images and improve processing time for restoring a backup image. A defragmentation module can be configured to defragment a backup image file by migrating portions of data of the backup image file that are stored in various containers at non-contiguous locations throughout the deduplicated data store. A defragmentation module can contiguously write the portions to one or more containers, which are stored at one or more new locations in the deduplicated data store. A defragmentation module can be configured to evaluate whether portions of a backup image file meet criteria for defragmentation. A defragmentation module can also be configured to update location information about the portions that are migrated to the new container(s).

BRIEF DESCRIPTION OF THE DRAWINGS

The present invention may be better understood, and its numerous objects, features and advantages made apparent to those skilled in the art by referencing the accompanying drawings.

FIGS. 4A and 4B are simplified block diagrams illustrating example deduplicated data stored in a deduplicated data store, according to one embodiment.

FIGS. 5A and 5B are simplified block diagrams illustrating example deduplicated data stored in containers in a deduplicated data store, according to one embodiment.

Figure 1:
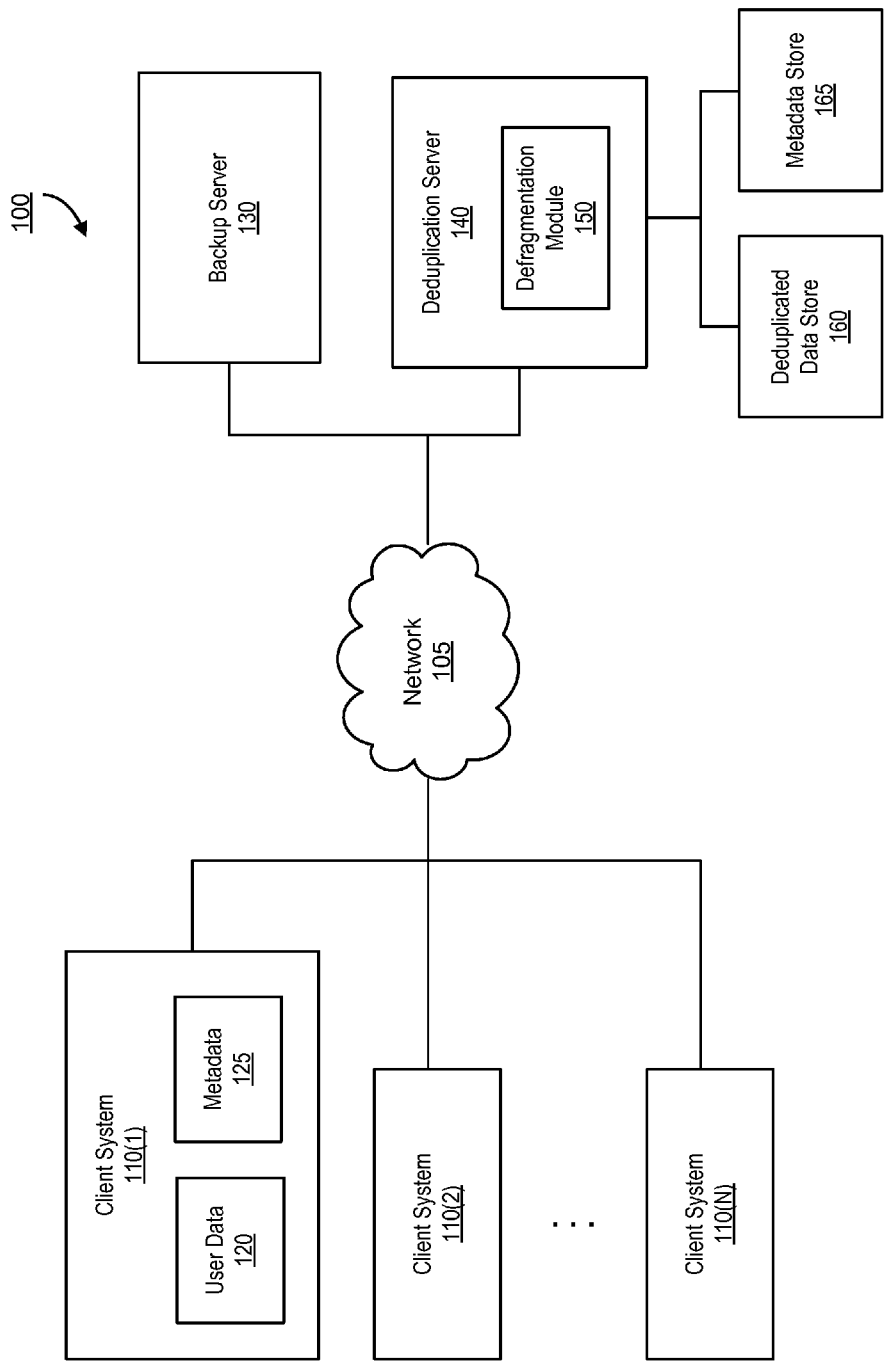
FIG. 1 is a simplified block diagram illustrating components of an example deduplication system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

FIG. 1 is a simplified block diagram illustrating components of an example deduplication system 100, in which the present disclosure can be implemented. Deduplication system 100 includes a network 105 that communicatively couples one or more client systems 110(1)-(N), a backup server 130, and deduplication server 140. Each component is discussed in further detail below.

One or more client systems 110(1)-(N), also referred to herein as client devices 110 and/or clients 110, can be implemented using, for example, a desktop computer, a laptop computer, a workstation, a server, or the like. An example of such computing devices is described subsequently, in connection with FIG. 8. One or more clients 110(1)-(N) can be configured to communicate with backup server 130 and deduplication server 140 via network 105. An example of network 105, which can be used by clients 110(1)-(N) to access backup server 130 and deduplication server 140, is a local area network (LAN) utilizing Ethernet, IEEE 802.11x, or some other communications protocol. While FIG. 1 illustrates client system 110(1) including user data 120 and metadata 125, each client system can store different user data 120 and metadata 125 in storage local to the client system.

User data 120 can include various data that is generated and/or consumed by a user of client system 110(1). User data 120 can include executable files, such as those used to implement applications and operating systems, as well as files that are used or generated by such executable files. User data 120 can include files generated by user applications (e.g., word processing programs, email programs, graphics programs, a database application, or the like) executing on client 110(1). Some of the user data 120 may also be transferred to backup server 130 and/or deduplication server 140 via a network 105 to be included in deduplicated data store 160. Each client 110 can send different user data 120 to backup server 130 and/or deduplication server 140.

Metadata 125 can include data about the user data 120. Metadata 125 can be generated by the client 110, such as during a backup process. Whenever a user (e.g., an application or human user) requests that client 110 add all or part of user data 120 to the deduplicated data store 160 (e.g., as part of a regularly scheduled full or partial backup of the client system), client 110 can read user data 120 and generate metadata 125 about the user data 120, such as one or more identifiers, or signatures, that can identify different portions of the user data 120. Client 110 can provide metadata 125 as a list (e.g., a list of signatures) to deduplication server 140. The metadata 125 can be used by the deduplication server 140 to determine whether a portion of the user data 120 is not duplicative of the data already stored in deduplicated data store 160 and should be added to the deduplicated data store 160, as further discussed below.

Backup server 130 is also coupled to network 105. Backup server 130 can include one or more physical servers configured to perform a variety of tasks related to management and implementation of backup services for the deduplication system 100, such as performing a full or partial backup of a client system. In the system illustrated in FIG. 1, backup server 130 is further configured to communicate with deduplication server 140 for purposes of storing backups of client systems 110(1)-(N) in resources controlled by deduplication server 140. Such communication can be via network 105 or via a direct link between the backup server 130 and the deduplication server 140. Information that can be provided by backup server 130 to deduplication server 140 can include a unique identification associated with each data stream provided by one of client systems 110(1)-(N) to the deduplication server 140. The backup server 130 can also provide sequence number identification for to identify sequential data transmitted in each uniquely identified data stream. Deduplication server 140 can then use such information to associate received data streams from client systems 110(1)-(N) in accord with embodiments of the present invention, as further discussed below.

Backup services can be implemented in the deduplication system 100 as a client-server application (not shown), with a server component (e.g., residing on backup server 130) and a client component (e.g., residing on client 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 130 can be configured to perform tasks that include communicating with clients 110 to initiate backup tasks on the clients, maintaining databases related to files and other information backed up from file systems associated with the clients, and managing or tracking resources storing backups of clients 110.

Deduplication server 140 is also coupled to network 105 and performs a variety of tasks related to management and implementation of deduplication services for the system illustrated in FIG. 1. Deduplication server 140 can include one or more physical servers configured to perform a variety of tasks related to deduplication services. For example, deduplication server 140 can provide deduplication services for eliminating duplicated data content in a backup context. Deduplication services help reduce an amount of storage needed to store backups of enterprise data (e.g., user data 120) by providing a mechanism for storing a piece of information only one time. Thus, in a backup context, if a piece of information is stored in multiple locations within an enterprise (e.g., on multiple client systems 110), that piece of information will only be stored one time in a deduplicated backup storage area, such as deduplicated data store 160. Also, if the piece of information does not change between a first backup and a second backup, then that piece of information will not be stored during the second backup as long as that piece of information continues to be stored in the deduplicated backup storage area. Data deduplication can also be employed outside of the backup context, thereby reducing the amount of active storage occupied by duplicated files.

Deduplication services can be implemented in the deduplication system 100 as a client-server application (not shown), with a server component (e.g., residing on deduplication server 140) and a client component (e.g., residing on client 110) of the client-server application. For example, during a backup process for storing a backup of user data 120 in deduplicated data store 160, a client component of the deduplication services can be configured to generate metadata 125 about the user data 120, such as one or more identifiers, or signatures, that can identify different portions of the user data 120, and to communicate the metadata 125 to a server component, which is discussed further below. Certain functions of the deduplication services can be performed by the client and server components, where the functions may be divided between the two components, or may be performed completely by one component or the other, depending on the implementation of the backup application.

Deduplication server 140 is in turn coupled to network storage for deduplicated data that includes a deduplicated data store 160 and a metadata store 165. Deduplicated data store 160 is a storage area in which deduplicated data can be stored. Deduplicated data store 160 can be configured as single instance storage. In single instance storage, only a single instance of a piece of data is stored. A common use of single instance storage is for maintaining data backups for servers and other computing clients in a network. For each backup, only a single instance of information duplicated in the deduplication system 100 will be stored in the single instance storage area. In addition, for subsequent backups occurring over time, data items that have not changed from one backup to another need not be stored in the subsequent backup. In this manner, significant savings in data storage space can be realized by eliminating duplicated data content.

Metadata store 165 is a storage area that contains various metadata about deduplicated data, such as information about backup images stored in deduplicated data store 160. The various metadata (including metadata 125) can be stored in a central index. For example, deduplication server 140 can use metadata 125, such as the list of signatures from client 110, to determine if portions of a backup image (e.g., portions of user data 120) are non-duplicative of portions already stored in deduplicated data store 160. Once deduplication server 140 determines that a portion of user data 120 is not duplicative of the data already stored in deduplicated data store 160 and thus should be added to the deduplicated data store 160, deduplication server 140 can store a corresponding identifier, or signature, of the portion of user data 120 in the central index. Deduplication server can request the non-duplicative portions (or unique portions) from client 110 by identifying the unique portion with the portion's associated signature. As the unique portions are received via a data stream from client 110, the unique portions can be written into a fixed-size container located in memory of the deduplication server 140, such as a cache.

Once the container is full of unique portions, the entire container is written to a location in deduplicated data store 160. The container written to the deduplicated data store 160 can also include a local container index, which indicates a local location of each unique portion stored within the container. The local container index can contain a signature associated with each unique segment stored in the container, or alternatively can contain a shortened version of the signature of each unique segment stored in the container. Deduplication server 140 can store a container identification (e.g., container ID) of the container in central index as a location for each unique portion in the container. The signature of a unique portion can also be associated with the location of the unique portion in an entry of the central index, where the central index includes an entry for each portion stored in the deduplicated data store 160. Thus, an identification of a portion's location, or a container ID, can be found in the central index by using the signature of the portion as a key in the central index. The location of the portion within the container identified by the container ID can be found in the local container index of the container by using at least a part of the signature as a key in the local container index.

Multiple backup images can be stored in the deduplicated data store 160. For example, a first backup image can be captured from user data 120 and can be stored in deduplicated data store 160. A subsequent backup image captured from user data 120 can contain duplicate portions that are identical to portions of the first backup image already stored in deduplicated data store 160 and can contain unique portions that are not identical to portions of the first backup image (e.g., portions that correspond to changed user data 120). The unique portions of the subsequent backup image can be written to deduplicated data store 160, while the duplicate portions will not be written (since the duplicate portions are identical to instances of portions already stored in deduplicated data store 160). Since only single instances of portions of a backup image are stored in deduplicated data store 160, metadata store 165 can provide a mapping of a backup image to the various non-duplicative portions stored in deduplicated data store 160 that compose the backup image. Thus, a single backup image can be associated with multiple portions stored throughout the deduplicated data store 160, and multiple backup images can be associated with a single portion (e.g., the multiple backup images share the single portion). For example, the subsequent backup image can be associated with unique portions of the subsequent backup image that were written to deduplicated data store 160 and with unique portions of the first backup image that were previously written to the deduplicated data store 160. Metadata store 165 can store associations between a backup image and the portions that compose the backup image as a group of references or pointers, where each reference indicates an entry of the central index that corresponds to a portion included in the backup image.

As additional backup images are added to deduplicated data store 160, backup image data can become fragmented across deduplicated data store 160 as portions of changed user data 120 are stored. Thus, a recent backup image stored in deduplicated data store 160 may include portions of recently changed user data 120 contiguously located in deduplicated data store 160, and may include multiple references to previously changed user data associated with older backup images, which are stored in various non-contiguous locations throughout deduplicated data store 160. If a user were to restore the recent backup image from deduplicated data store 160, deduplication server 140 would have to read numerous portions of data associated with older backup images from across the various locations (e.g., various containers) in deduplicated data store 160. Thus, as a backup image becomes more fragmented, restoration of the backup image can become more inefficient due to the increasing amount of time spent on performing a growing number of access operations needed to read each portion of data of the backup image from various locations in deduplicated data store 160 (e.g., determining a location for each of the multiple portions from metadata store 165).

Defragmentation module 150 can be implemented in deduplication server 140 to reduce fragmentation of backup images and improve processing time of restoring a backup image. Defragmentation module 150 can be configured to defragment a file, such as a recent backup image, by migrating portions of data stored in various containers at non-contiguous locations throughout deduplicated data store 160. Defragmentation module 150 can contiguously write the portions to one or more containers, which are stored at one or more new locations in deduplicated data store 160. Thus, defragmentation module 150 can bring physically dispersed portions of data together to improve locality of data of a file and improve efficiency of restoring the file. Defragmentation module 150 can also be configured to evaluate whether portions of a file, such as a backup image, meet criteria for defragmentation. Defragmentation module 150 can also be configured to update location information about the portions that are migrated to the new container(s).

Deduplicated data store 160 and metadata store 165 can be stored in network storage. Network storage can be implemented as network attached storage (NAS), file servers, storage filers, and/or network shares. Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's OS, for example. Network storage can include a data volume.

In light of the present disclosure, it will be appreciated that network storage can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, clients 110(1)-(N) can be directly coupled to deduplicated data store 160 and/or metadata store 170, and so on.

The letter N is used to indicate a variable number of devices or components. For example, a variable number of clients are implemented in the deduplication system. Although the letter N is used in describing a variable number of instances of each of these different devices and components, a repeated use of the letter N does not necessarily indicate that each device and component has a same number of N instances implemented in the deduplication system.

Figure 2:
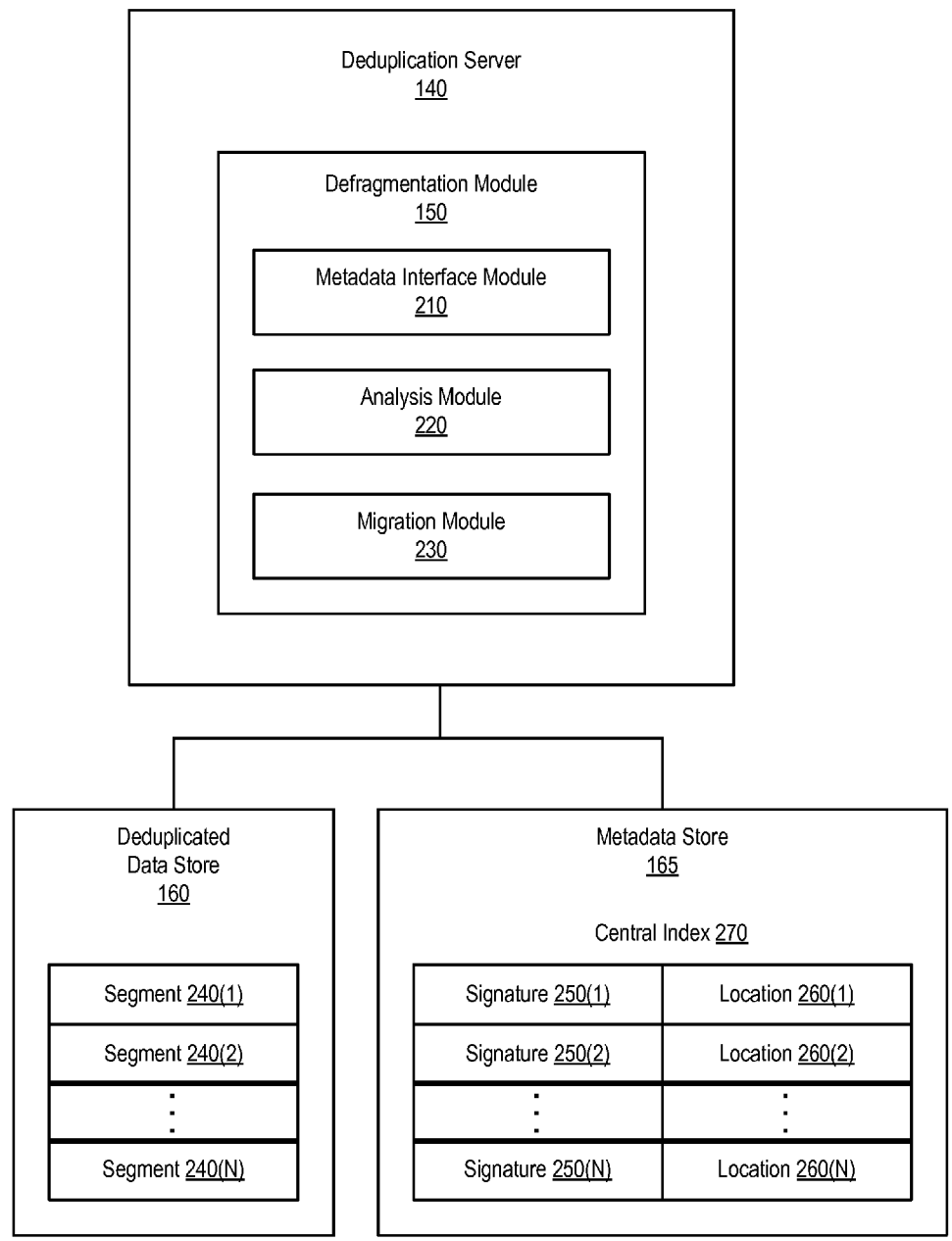
FIG. 2 is a simplified block diagram illustrating components of an example defragmentation module, according to one embodiment.

FIG. 2 is a simplified block diagram illustrating components of an example defragmentation module 150. A defragmentation module 150 can be implemented in a deduplication server 140. A defragmentation module 150 can include various components, such as a metadata interface module 210, an analysis module 220, and a migration module 230, which are discussed in further detail below.

In order to perform data deduplication, a deduplication system needs to be able to identify redundant copies of the same data. One way that can provide a reasonable likelihood of finding duplicated instances of data is to divide file data into consistently-sized segments, which are analyzed for duplication in the deduplicated data store. Thus, if only a portion of a large file is modified, then only the segment of data corresponding to that portion of the file need be stored in the deduplicated data store 160 and the remainder of the file segments will not be duplicated. In the embodiments described herein, a backup image file can be divided into a plurality of chunks, and each chunk can be divided into a plurality of fixed-size segments.

In the embodiment shown, deduplicated data store 160 includes a set of segments 240(1)-(N), also referred to herein as segments 240, of deduplicated data. The segments 240 can be received from one or more clients 110. Typically, each segment 240 is unique (i.e., no two segments stored within segments 240 have the same value). Also, in the embodiment shown, metadata store 165 includes a central index 270 that includes multiple entries, where each entry is associated with a segment. Each entry includes a signature of a set of signatures 250(1)-(N), also referred to herein as signatures 250, and a location of a set of locations 260(1)-(N), also referred to herein as locations 260. Each signature is an identifier of a respective segment 240. For example, signature 250(1) can identify segment 240(1), signature 250(2) can identify segment 240(2), signature 250(N) can identify segment 240(N), and so on. Each location is a location of a respective segment 240. For example, location 260(1) indicates the location of unique segment 240(1), location 260(N) indicates the location of unique segment 240(N), and so on. Each signature 250 of an entry is associated with a location 260 of the entry.

Rather than comparing a segment itself to each segment stored in deduplication data store (which can be enormously time- and processing-prohibitive), detection of duplicative data is usually performed by comparing smaller data signatures of each data segment. Deduplication server 140 uses signatures 250 to determine whether a given segment is already stored in deduplicated data store 160. Each signature 250 can be a checksum or hash value that is calculated based upon data within the segment. In many embodiments, signatures are generated in a manner (e.g., using a cryptographically strong, collision resistant hash function) that produces the same identifier for identical items of data, while also producing different identifiers for non-identical items of data. Regardless of which particular technique is used to generate signatures in the deduplication system 100, the same signature-generation technique is implemented by all deduplication clients of deduplication server 140. In one example, signature generation can be performed by deduplication clients (e.g., client 110 of FIG. 1). Signatures generated on a client 110 can be transmitted to deduplication server 140, without also transmitting the segments themselves to deduplication server 140. In an alternative example, client 110 can transmit the segments themselves to deduplication server 140, and deduplication server 140 can use the same signature-generation technique to generate signatures for the segments. However, in such an alternative example, server-side signature generation can consume a greater amount of network resources (e.g., bandwidth) and processing resources (e.g., a processor of deduplication server 140), as compared to client-side signature generation.

By comparing a newly generated signature of a new segment to the signatures 250(1)-(N) of segments 240 already stored by the deduplication system 100, deduplication server 140 can determine whether to add the new segment to the deduplicated data store 160 (e.g., the new segment is a unique segment). In particular, if a new segment's signature does not match any existing signature 250 presently stored in metadata store 165, deduplication server 140 can determine that the new segment is not already stored within segments 240 in deduplicated data store 160. In response, deduplication server 140 can add the new segment to the deduplicated data store 160, and add the new signature to the metadata store 165. If the new segment has not been received at deduplication server 140, deduplication server 140 can request that the client 110 transmit the particular segments corresponding to the new signatures that are not present in the metadata store 165. Deduplication server 140 use the metadata 125 received from client 110 (e.g., a list of signatures of the segments) to identify the requested segments to client 110 (e.g., identify each requested segment by its corresponding signature). Client 110 can transmit the requested segments over network 105 via a data stream.

As the requested segments are received, deduplication server 140 can write the segments into a fixed-size container located in memory of the deduplication server 140, such as a cache. Once the container is full, the entire container can be written to a location in the deduplicated data store 160, which adds the segments within the container to the set of segments 240 already stored in deduplicated data store 160 (e.g., adding a new segment to deduplicated data store 160 as segment 240(N+1)). Deduplication server 140 can generate metadata, such as location 260(1)-(N), that indicates the location of each segment written to deduplicated data store 160. For example, each unique segment can be associated with a location 260 of the particular segment, such as a container identification (container ID) that contains the unique segment. Deduplication server 140 can create a new entry in central index 270 for a new segment, and can store the segment's location in the new entry. Deduplication server 140 can also add the new signature of a segment to the new entry associated with the corresponding segment. Thus, in the embodiment shown, a new central index entry can contain a new signature 250(N+1) and a new location 260(N+1) that correspond to a new segment 240(N+1) that is stored in deduplicated data store 160.

If a new segment's signature matches an existing signature 250 presently stored in metadata store 165, deduplication server 140 can determine that the new segment is likely to be already stored within segments 240 (e.g., the new segment is a common segment), and thus does not need to be written to deduplication data store 160 (in some situations, such as those in which checksums are used as signatures, this determination may also involve comparing the new segment to the existing segment(s) that are identified by the matching signature).

Metadata store 165 can also include additional information about segments of files (e.g., backup images), such as a mapping of a file to the various unique segments stored in deduplicated data store 160 that compose the file. When unique segments of a file are stored in deduplicated data store 160, deduplication server 140 can create an association between each newly-stored unique segment and the file. The associations can be stored in a catalog table of metadata store 165 as a group of references or pointers, where each reference indicates an entry of the central index that corresponds to a newly-stored unique segment of the file. Since only unique segments of the file are stored in deduplicated data store 160, the duplicative segments of a file are not stored again in deduplicated data store 160. Instead, the file can also be associated with (unique) segments already stored in deduplicated data store 160 that are identical to the (duplicative) segments of the file. Thus, a unique segment can be part of one or more files (e.g., a common segment can be shared among different backup images stored in deduplicated data store 160). The associations between a file and the previously stored unique segments can also be stored in the catalog table as additional references or pointers of the group of references or pointers, where each additional reference indicates an entry of the central index that corresponds to the previously stored unique segment that is identical to a duplicative segment of the file. Thus, each segment of the file corresponds to a unique segment stored in the deduplicated data store 160, and a file can be restored using the various unique segments that are associated with the file.

Defragmentation module 150 can include a metadata interface module 210, which can be configured to communicate with metadata store 165 in order to retrieve information about deduplicated data in the deduplicated data store 160. For example, metadata interface module 210 can access the catalog table and central index to retrieve a file segment listing of a particular file, such as a backup image file. The file segment listing can include a signature 250 and a location 260 (e.g., container ID) of each segment associated with the particular file. Metadata interface module 210 can provide the listing to analysis module 220.

Defragmentation module 150 can include an analysis module 220, which can be configured to perform an analysis of each chunk of a file (e.g., a backup image file) stored in deduplicated data store 160 to determine chunks that are candidates for defragmentation. Analysis module 220 can receive the file segment listing for a particular file and can group multiple file segments into chunks. Analysis module 220 can perform an analysis on each chunk of the backup image to determine whether each chunk would benefit from defragmentation (e.g., the segments of the chunk can be stored in a fewer number of containers), as discussed in further detail below. Once a candidate chunk is determined, analysis module 220 can provide the chunk (e.g., can provide a chunk identification or a list of segment identifications of the chunk) to migration module 230.

Defragmentation module 150 can include a migration module 230, which can be configured to migrate candidate chunks to one or more new containers in a new location deduplicated data store 160. Migration module 230 can be configured to communicate with deduplicated data store 160 to read each segment of a candidate chunk and contiguously write the segments to one or more new containers. Segments can be contiguously written to a container until the container is full, and subsequent segments can be contiguously written to a next container. The new containers are written to a new location in deduplicated data store 160. Migration module 230 can also be configured to update metadata in metadata store 165 to reflect the new location of a segment. For example, location 260 of a unique segment that has been migrated to a new container can be updated to indicate a container ID of the new container. Migration module 230 can also be configured to delete data of a segment itself from the previous location in deduplicated data store 160, once the segment has been migrated to the new location, in order to preserve single instance storage. The storage space that is freed once a segment is deleted can be reclaimed for future use (e.g., future storage of segments) by the deduplication server 140.

Figure 3:
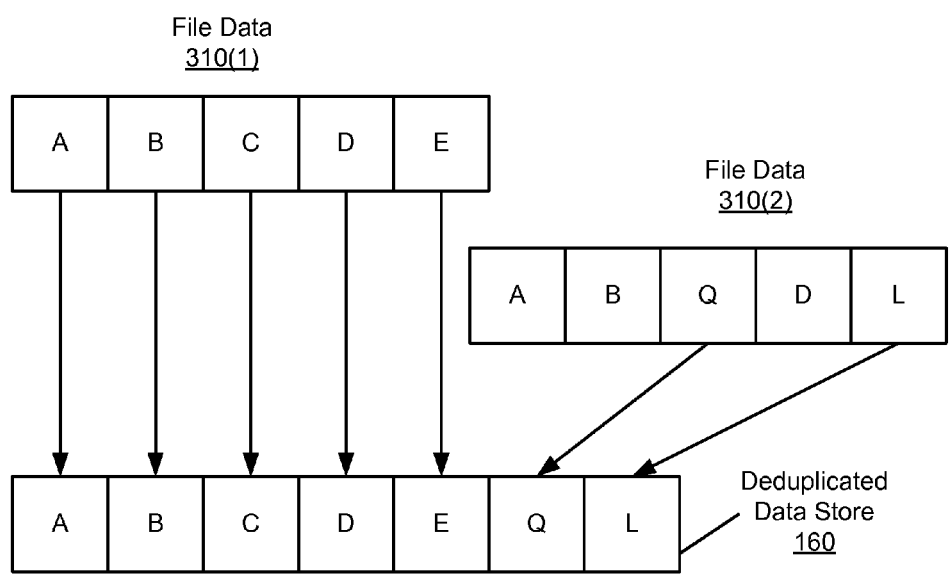
FIG. 3 is a simplified block diagram illustrating a method of data deduplication, according to one embodiment.

FIG. 3 is a simplified block diagram illustrating a method of data deduplication. File data 310(1) and file data 310(2) share identical content, but the files themselves are not completely identical. Each file is broken into segments: A, B, C, D, E for file data 310(1) and A, B, Q, D, L for file data 310(2). The data deduplication system will write file segments A, B, C, D, E, Q and L into the deduplicated data storage area 160 (e.g., single instance storage area) and will not write file segments A, B and D from file data 310(2) into the deduplicated data store 160. Thus, if two file segments are the same, one can save space in a storage area by only storing one copy of the segment and providing two pointers (e.g., one corresponding to file data 310(1) and the other to file data 310(2)) to that segment. In order to track a location of data for a file, metadata containing pointers to the data (i.e., file segments) of a file can be stored in a metadata storage area 165, such as in a catalog table.

Figure 5B:
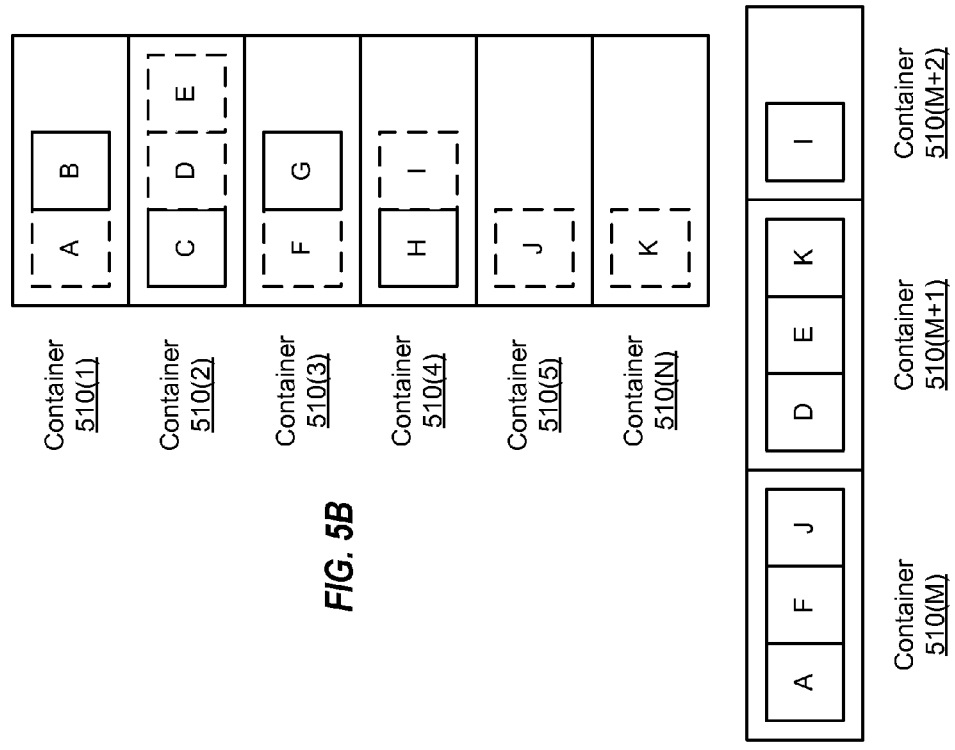
Figure 4B:
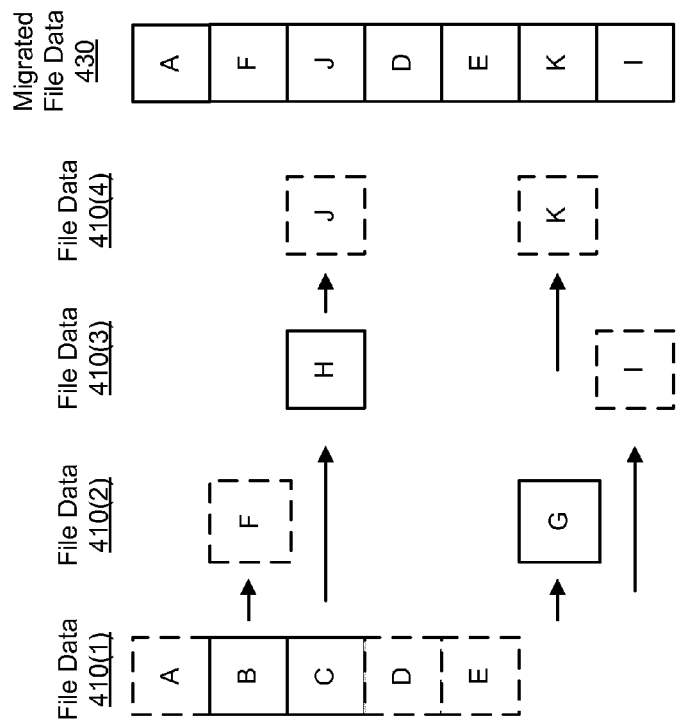

FIG. 4A and FIG. 5A illustrate example deduplicated data stored in deduplicated data store 160, before a defragmentation process has been implemented. FIG. 4B and FIG. 5B illustrate example deduplicated data stored in deduplicated data store 160, after a defragmentation process has been implemented. These figures are discussed in further detail below.

FIG. 4A is a simplified block diagram that illustrates example deduplicated data stored in deduplicated data store 160. File data 410(1)-(4) are deduplicated data (i.e., unique segments) that are presently stored in deduplicated data store 160. File data 410(1) represents a chunk of a first file, such as a first backup image file, which contains segments A, B, C, D, and E. A first backup image can be generated from user data 120 of a client 110.

File data 410(2) represents a chunk of a second file, such as a second backup image file. The second backup image file can be a subsequent backup of user data 120 of client 110 that is created at a time after the first backup image file. At the time the second backup image file is captured, segments A, C, D, and E have not changed, and therefore are not duplicatively stored as part of the second backup image file. Alternatively, the second backup image file can be generated from different user data, which can be a different portion of user data 120 of the same client, or can be user data 120 of a different client. The second file can share one or more segments A, C, D and E from the first file (e.g., the second file contains data that is presently stored in the deduplicated data store 160). In both cases, metadata store 165 can include metadata about the second file, such as an indication that the second file includes one or more segments A, C, D, and E that are already stored in deduplicated data store 160 (e.g., metadata in a catalog table that indicate segments A, C, D, and E associated with the first file are also associated with the second file).

In the embodiment shown, the second file contains user data 120 that is different from the data of segment B (and different from data of other segments stored elsewhere in the deduplicated data store 160). The different user data can be stored as new segment F in deduplicated data store 160. Different user data can be user data 120 (e.g., of a client 110) backed up in segment B that has changed since the first backup image file was taken, where the changes are captured in segment F of the second backup image file. Alternatively, different user data 120 can be a different portion of user data 120 from the same client, or user data 120 from a different client, which has been captured in segment F of the second file. Additionally, user data 120 that is not stored as part of the first file (nor stored elsewhere in the deduplicated data store 160) can be stored in the deduplicated data store 160 as new segment G as part of the second file, and metadata of the second file can indicate segment G is associated with the second file.

File data 410(3) represents a chunk of a third file, such as a third backup image file. As discussed above, a third backup image can be a subsequent backup of user data 120 of client 110 that is created at a time after the second backup image file, or a third backup image file can be generated from different user data. The third file can share one or more segments of the first file and/or second file (and/or other segments in deduplicated data store 160). Metadata store 165 can include metadata about the segments included in the third file. The third file can contain different user data (e.g., which can be user data 120 that has changed from a previous backup image file, a different portion of user data 120 from the same client, or user data 120 from a different client) than segment C or any other segment stored in deduplicated data store 160. The different user data can be stored in deduplicated data store 160 as new segment H. Similarly, user data 120 that is not included in the first file or in the second file (or elsewhere in the deduplicated data store 160) can be stored as new segment I. Metadata of the third file can indicate that both segment H and segment I are part of the third file.

File data 410(4) represents a chunk of a fourth file, such as a fourth backup image file. As discussed above, a fourth backup image can be a subsequent backup of user data 120 of client 110 that is created at a time after the third backup image file, or a fourth backup image file can be generated from different user data. The fourth file can share one or more segments of the first file, the second file, and/or the third file (and/or other segments in deduplicated data store 160). Metadata store 165 can include metadata about the segments included in the fourth file. The fourth file can contain different user data than segment H or any other segment stored in deduplicated data store 160. The different user data can be stored as new segment J. Similarly, the fourth file contains additional different user data than segment G or any other segment stored in deduplicated data store 160. The additional different user data can be stored as new segment K, and metadata of the fourth file can indicate that both segment J and segment K are part of the fourth file.

In the embodiment illustrated, restoration of the fourth file would produce restored file data 420. Restored file data 420 can include segments A, F, J, D, E, K, and I, where the segments are read from multiple locations across deduplicated data store 160. Restoration of the fourth file would require a large amount of processing time, including a large amount of time needed to find and read each segment from various and disparate locations across deduplicated data store 160.

FIG. 5A is a simplified block diagram illustrating example deduplicated data stored in containers in deduplicated data store 160. The deduplicated data illustrated in FIG. 4A is illustrated in FIG. 5A as unique segments that are written to deduplicated data store 160 via containers 510(1)-(N), also referred to herein as containers 510. File segments can be transmitted from multiple clients 110 to deduplication server 140 via multiple data streams. Deduplication server 140 can write file segments of the data streams to containers 510 in memory, such as a cache. Each container can contain file segments of a single data stream (or alternatively, each container can contain file segments of multiple data streams). Once a container is full, the container (and the file segments contained therein) is written to deduplicated data store 160. Containers (e.g., containers that each include file segments of a particular data stream) can be filled at different rates (e.g., depending on a data transfer rate of the data stream), and thus the containers of different data streams can be written to deduplicated data store 160 in an interleaved manner.

In the embodiment shown, FIG. 5A illustrates file data 410(1), which includes segments A, B, C, D, and E of a single file (e.g., a first backup image file), as being included in two containers, container 510(1) and container 510(2). An example container size shown for illustrative purposes is three segments. Container 510(1) (and other containers 510) can contain another segment that is part of another file transmitted via a same data stream from a client 110. While container 510(1) is shown as being in close proximity to container 510(2), many intervening containers can, in fact, be written to deduplication data store 160 between a first time when container 510(1) is written and a second time when container 510(2) is written. The intervening containers can cause the containers that include file segments of a single file to be written to disparate locations within deduplicated data store 160, thus fragmenting the single file. Thus, as a single file becomes fragmented across the deduplicated data store 160, additional processing time is required to restore the single file, which includes time for finding and reading the segments of the file.

Similarly, a file that shares segments already stored in deduplicated data store 160 can also require additional processing for restoration, which includes time for finding and reading segments of the file from various disparate locations in deduplication data store 160. For example, container 510(3) includes segments F and G of file data 410(2), container 510(4) includes segments H and I of file data 410(3), container 510(5) includes segment J of file data 410(4), and container 510(N) includes segment K of file data 410(4). Restoration of the fourth file would produce restored file data 420 (as illustrated in FIG. 4A), which can include segments A, F, J, D, E, K, and I. Each of these segments can be read from multiple containers located across deduplicated data store 160. In the embodiment shown, the segments would be read from the 6 containers shown (e.g., containers 510(1)-(5) and 510(N)).

FIG. 4B is another simplified block diagram that illustrates example deduplicated data stored in a deduplicated data store 160, after a defragmentation process has been implemented. In the embodiment shown, file data 410(4) has been defragmented, and segments A, F, J, D, E, K, and I have been migrated to one or more new locations in deduplicated data store 160. Migrating a segment can include copying the segment to a new location, and removing the segment from the previous location (e.g., deleting the segment, or removing a file system pointer to the segment). FIG. 4B illustrates removed segments by a broken line.

Metadata about file data 410(1)-(4) can also be updated to reflect the new location(s) of the migrated segments. For example, metadata about file data 430 (4) can be updated to indicate that segments A, F, J, D, E, K, and I can be located at one or more new locations in deduplicated data store 160, and that the fourth file shares the segments with another file. Metadata about file data 430(1) can be updated to indicate that segments A, D, and E are now located at one or more new locations in deduplicated data store 160, and that the first file shares the segments with the fourth file (e.g., segment A is associated with both the fourth file and the first file).

FIG. 5B is a simplified block diagram that illustrates example deduplicated data stored in containers in deduplicated data store 160. The deduplicated data illustrated in FIG. 4B is also illustrated in FIG. 5B, where file data 410(4) has been defragmented. Segments A, F, J, D, E, K, and I have been migrated to one or more new containers, shown as containers 510(M), (M+1), and (M+2). Segments A, F, J, D, E, K, and I have been contiguously written to the one or more new containers, and have been removed from their previous locations, as illustrated by a broken line. Thus, restoration of the fourth file would produce restored file data 420 (as illustrated in FIG. 4A), which can include segments A, F, J, D, E, K, and I. Each of these segments can be read from the new containers located in deduplicated data store 160. In the embodiments shown, the segments would be read from 3 (rather than 6) containers, or containers 510(M), 510(M+1), and 510(M+2), thus reducing processing time, since segments contiguously located within a same container can be found and read more quickly than segments located in various and disparate containers located across the deduplicated data store 160.

Figure 6:
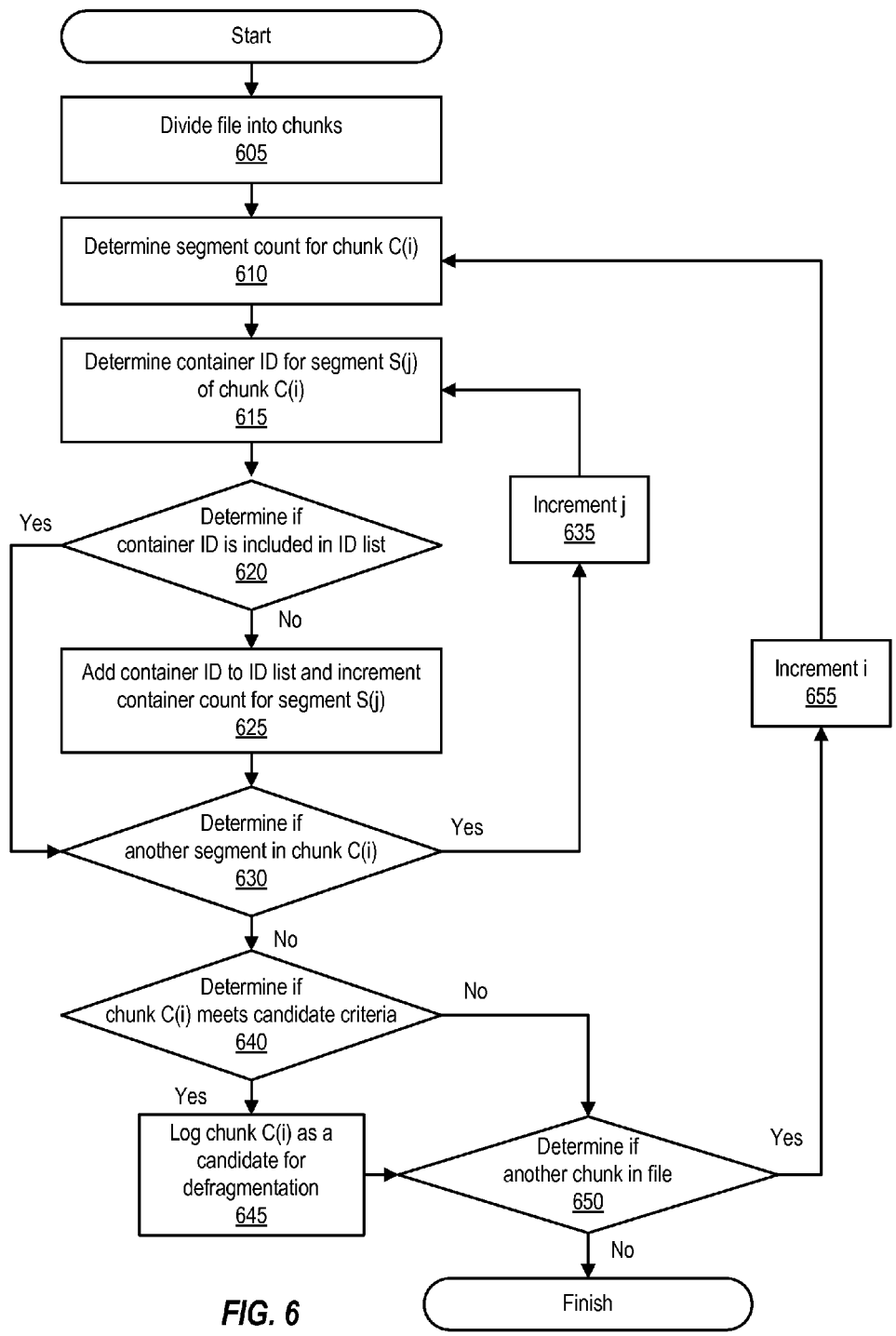
FIG. 6 is a flowchart illustrating an example analysis process implemented by a defragmentation module, according to one embodiment.

FIG. 6 is a flowchart illustrating an example analysis process implemented by a component of defragmentation module 150, such as by an analysis module 220 of defragmentation module 150. Defragmentation module 150 can analyze a file to determine whether any chunks of the file would benefit from defragmentation (e.g., the segments of the chunk can be stored in a fewer number of containers). The analysis process begins at operation 605, dividing a file into chunks. As discussed above, metadata interface module 210 can retrieve metadata from metadata store 165, such as a catalog table and a central index, to produce a file segment listing for a particular file. The file segment listing includes a signature and a location for each segment of the file. Metadata interface module 210 can provide the file segment listing to analysis module 220. Analysis module 220 can group the segments of the file into chunks (e.g., can associate multiple segments with a chunk), thus dividing the file into chunks. Analysis module 220 can store association information about each segment-chunk association in a master segment-chunk list of the file. The master segment-chunk list can be stored in local memory of the deduplication server 140, such as a cache.

The process of FIG. 6 continues to operation 610, determining a segment count for a chunk C(i). Operation 610 begins a sequence of operations that can be repeated for each chunk in the file. A present iteration of the sequence is indicated by the letter i, which can be initialized to one (thus starting the sequence with a first chunk of the file) when the analysis module 220 begins the analysis process of a file. At the end of the sequence, the letter i is incremented (e.g., operation 655), indicating that a next chunk of the file can be analyzed (if there is another chunk to be analyzed).

A segment count can be determined by calculating the total number of segments included within the present chunk C(i). Chunks can be fixed- or variable-sized, meaning that a same number of segments can be found within a chunk (e.g., fixed-size) or a varying number of segments can be found within a chunk (e.g., variable-size). A chunk size of a chunk (e.g., either a fixed- or variable-size chunk) can be calculated by multiplying the segment count by a segment size (which is also a fixed-size segment).

The process of FIG. 6 continues to operation 615, determining a container identification (ID) for a segment S(j) of the present chunk C(i). Operation 620 begins another sequence of operations that can be repeated for each segment in the chunk. A present iteration of the sequence is indicated by the letter j, which can be initialized to one (thus starting the sequence with a first segment of the chunk) when the analysis process begins analysis of a new chunk. At the end of the sequence, the letter j is incremented (e.g., operation 635), indicating that a next segment of the chunk can be analyzed (if there is another segment to be analyzed).

A container ID can be determined by reading a location associated with the present segment S(j) from the file segment listing. The process of FIG. 6 continues to operation 620, determining if the container ID of the present segment S(j) is included in a temporary ID list. Temporary ID list can be initialized to a blank list when the analysis process begins analysis of a new chunk. Temporary ID list maintains a running list of unique containers that contain segments of the present chunk C(i). Temporary ID list can also maintain a running count of the total number of containers that need to be accessed in order to retrieve segments of the chunk during restoration of the file, where the running count can be calculated by summing the total number of entries in temporary ID list. Alternatively, a container count can be maintained separately from temporary ID list, which can be initialized to zero when the analysis process begins analysis of a new chunk.

An analysis module 220 can determine whether a container ID of the segment S(j) is included in temporary ID list by searching the temporary ID list for the container ID. If a matching container ID is found in one of the temporary ID list entries (e.g., the temporary ID list entry contains an identical container ID), the container ID of the present segment S(j) is determined to be included in the temporary ID list. The presence of the container ID in temporary ID list means that the present segment S(j) is stored in a container that includes another previously analyzed segment of the chunk, and thus the container ID of the present segment S(j) does not need to be added to the temporary ID list. If no matching container ID is found in the temporary ID list, the container ID of the present segment S(j) is not determined to be included in the temporary ID list. The absence of the container ID in temporary ID list means that the container ID of the present segment S(j) needs to be added to the temporary ID list in order to track the number of containers that contain segments of the chunk.

If a container ID is not determined to be included in temporary ID list, the process of FIG. 6 continues from operation 620 to operation 625, adding the container ID to the temporary ID list, and incrementing the container count. Container ID can be appended to the temporary ID list. As mentioned above, a separate container count can be maintained, which can indicate a running count of unique containers that contain segments of the present chunk C(i), and thus indicates a total number of containers that need to be accessed in order to retrieve segments of the chunk during restoration of the file. Alternatively, the container count can be determined by determining a total number of entries in temporary ID list (after the container ID of the present segment S(j) has been added to the temporary ID list). The process continues to operation 630, determining if another segment is in chunk C(i).

Returning to operation 620, if a container ID is determined to be included in temporary ID list, the process continues to operation 630, determining if another segment is left in chunk C(i). Analysis module 220 can check whether all segments associated with the chunk have been processed, such as by referring to a master list of segment-chunk associations of the file, to determine whether another segment is associated with the present chunk and has not been analyzed. If another segment is left in chunk C(i), the process of FIG. 6 continues to operation 635, incrementing j, and returning to operation 615 to begin analysis of a next segment of present chunk C(i).

If another segment is not left in chunk C(i), the process of FIG. 6 continues operation 640, determining if present chunk C(i) meets candidate criteria. Candidate criteria can be defined by an administrator when configuring defragmentation module 150. Candidate criteria can be defined as a ratio between the chunk size of the present chunk C(i) and the total number of containers storing segments of the present chunk C(i) (e.g., container count). Thus, for a given chunk size, as the chunk becomes more fragmented (i.e., the container count increases), the ratio value decreases. A chunk that is less defragmented and/or has segments that are migrated into fewer containers, the ratio value of the chunk will increase. Alternatively, candidate criteria can be defined as a ratio between the total number of segments in present chunk C(i) (e.g., segment count) and the total number of containers storing segments of the present chunk C(i) (e.g., container count). Thus, for a given segment count of a chunk, as the chunk becomes more fragmented and the total number of containers increases, the value of the ratio decreases.

A ratio of a chunk that falls below a threshold value can indicate that the present chunk C(i) meets the candidate criteria and is a candidate for defragmentation. The threshold value can be set by an administrator and can be adjusted (e.g., increased or decreased) either by the administrator or by dynamic adjustment based on the results of previous segment defragmentation. For example, the threshold value can be decreased (e.g., by the administrator or by dynamically decreasing the threshold value by an amount) to better capture worst-case chunks (e.g., the most severely fragmented chunks of deduplication data store 160) that would benefit the most from defragmentation. As chunks in deduplication data store 160 are defragmented, the threshold value can be increased (e.g., by the administrator or by dynamically increasing the threshold value by an amount) to begin capturing chunks that are not as fragmented as the worst-case chunks, but that could still benefit from defragmentation.

A threshold limit can also be set to prevent excessive segment relocation thrashing. Since files can share segments, defragmentation of one file can cause fragmentation of another file. In such a scenario, prolonged performance of chunk defragmentation by defragmentation module 150 can cause other chunks to become fragmented, which provides little additional defragmentation progress overall (e.g., progress relative to the deduplicated data store 160) and thus results in segment relocation thrashing. The threshold limit can prevent excessive segment relocation thrashing by setting an upper limit on the threshold value, thus preventing the threshold value from increasing beyond the threshold limit (and preventing defragmentation module 150 from capturing less fragmented chunks as possible candidates for defragmentation).

If present chunk C(i) meets candidate criteria, the process of FIG. 6 continues to operation 645, logging chunk C(i) as a candidate for defragmentation. Analysis module 220 can log an identification of the present chunk C(i) in a candidate chunk log and can provide the candidate chunk log to migration module 230, once the analysis of the file is complete. The process of FIG. 6 continues to operation 650, determining if another chunk is left in the file.

Returning to operation 640, if present chunk C(i) does not meet candidate criteria (and is thus not a candidate for defragmentation), the process of FIG. 6 continues to operation 650, determining if another chunk is left in the file. Analysis module 220 can check whether all chunks associated with the file have been processed, such as by referring to a master list of segment-chunk associations of the file, to determine whether another chunk is associated with the file and has not been analyzed. If another chunk is left in the file, the process of FIG. 6 continues to operation 655, incrementing i, and returning to operation 610 to begin analysis of a next chunk of the file. Operation 655 can also include initializing letter j to one, since a new chunk is being analyzed. If there is not another chunk left in the file (e.g., all chunks of the file have been analyzed), the process of FIG. 6 ends. The process can be repeated for other files that need to be analyzed.

Also, although not shown, defragmentation module 150 can also be configured to stop performing defragmentation based on a time limit (e.g., defragmentation can be performed during a window of time, such as during non-business hours) and/or based on a space limit (e.g., a set amount of segment defragmentation, or total size of defragmented segments, has been reached).

Figure 7:
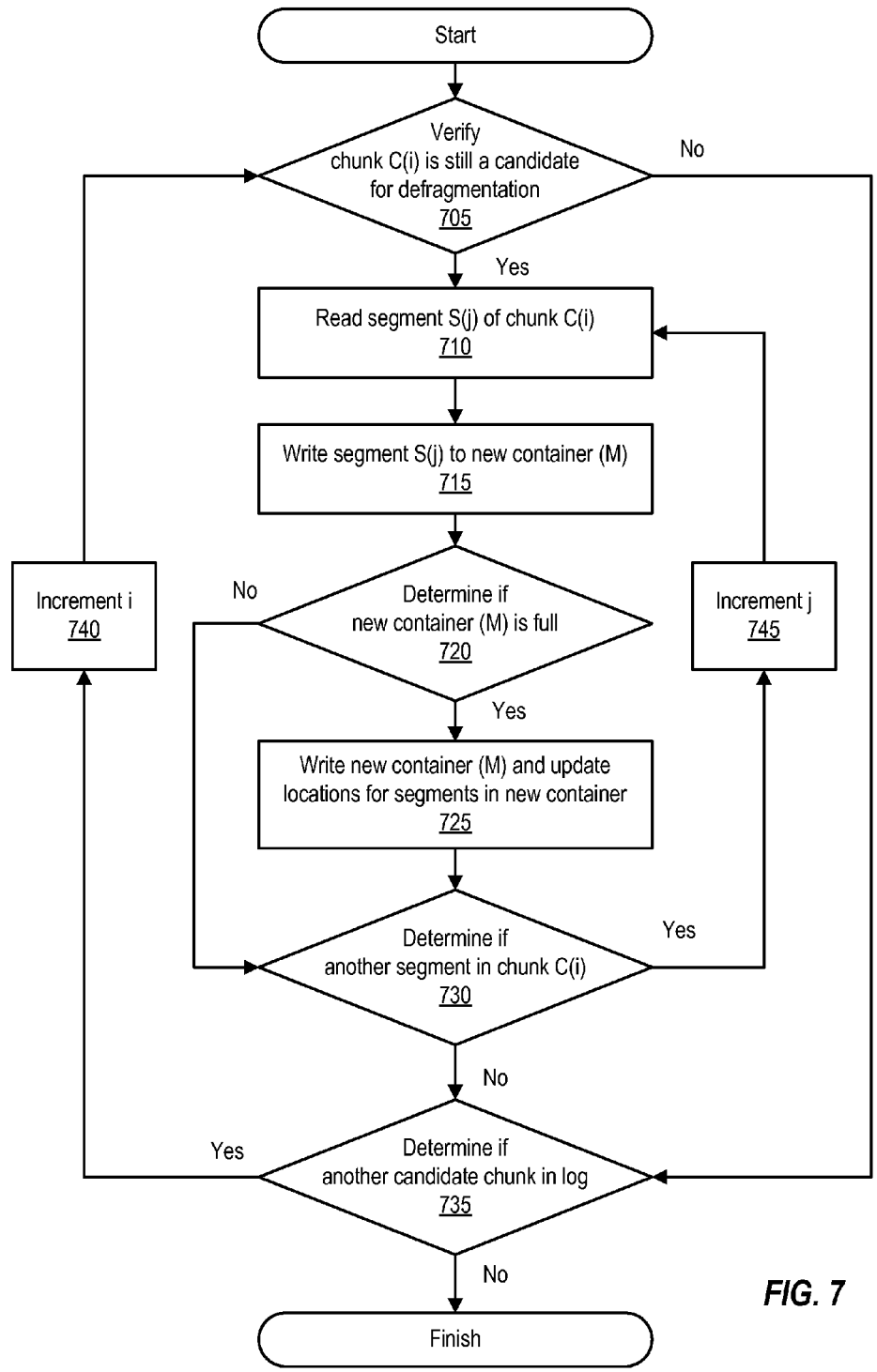
FIG. 7 is a flowchart illustrating an example defragmentation process implemented by a defragmentation module, according to one embodiment.

FIG. 7 is a flowchart illustrating an example defragmentation process implemented by a component of a defragmentation module 150, such as a migration module 230. Analysis module 220 can provide a log of candidate chunks to migration module 230, and migration module 230 can defragment each candidate chunk. Migration module 230 can defragment a chunk by migrating segments of the chunk presently located in multiple containers to one or more new containers, where the number of new containers is less than the number of previous containers. The analysis process of FIG. 6 and the defragmentation process of FIG. 7 can be performed at different times when deduplicated data store 160 is not in high demand (e.g., during evening or non-business hours). The process of FIG. 6 can be performed on certain days to log candidate chunks, and the process of FIG. 7 can be performed on certain other days to perform defragmentation of the candidate chunks.

The defragmentation process begins at operation 705, verifying that chunk C(i) is still a candidate for defragmentation. Operation 705 begins a sequence of operations that can be repeated for each candidate chunk in the log of candidate chunks. A present iteration of the sequence is indicated by the letter i, which can be initialized to one (thus starting the sequence with a first candidate chunk of the log of candidate chunks) when the migration module begins the migration process. At the end of the sequence, the letter i is incremented (e.g., operation 740), indicating that a next candidate chunk of the log can (possibly) be defragmented (if there is another candidate chunk in the log of candidate chunks).

Migration module 230 can verify that present chunk C(i) is still a candidate chunk by requesting that analysis module 220 perform an analysis of chunk C(i) (e.g., repeat the analysis process of FIG. 6 for present chunk C(i), rather than for the entire file). A present chunk C(i) may no longer be a candidate for defragmentation if the total number of containers have decreased, which can result from defragmenting another chunk that shares segments with present chunk C(i).

If the present chunk C(i) is not verified as being a candidate chunk (e.g., the present chunk C(i) no longer meets candidate criteria), the process of FIG. 7 continues to operation 735, determining if another candidate chunk is left in the log of candidate chunks. If there is another candidate chunk, the process of FIG. 7 continues to operation 740, incrementing i, and returning to operation 705 to begin (possibly) defragmenting a next candidate chunk of the candidate chunk log, as discussed in further detail below.

Returning to operation 705, if the present chunk C(i) is verified as being a candidate chunk (e.g., the present chunk C(i) still meets candidate criteria, the process of FIG. 7 continues to operation 710, reading segment S(j) of chunk C(i) from deduplicated data store 160. Operation 710 begins another sequence of operations that can be repeated for each segment in a chunk. A present iteration of the sequence is indicated by the letter j, which can be initialized to one (thus starting the sequence with a first segment of the chunk) when the defragmentation process begins defragmenting a new chunk. At the end of the sequence, the letter j is incremented (e.g., operation 745), indicating that a next segment of the chunk can be migrated to a new container (if there is another segment to be migrated).

A location of the present segment S(j) can be read from the file segment listing, where the location indicates a container ID of the container that contains the present segment S(j). Migration module 230 can find the container at the location indicated by container ID, and can access a local container index to find the local location of the segment S(j) within the container. The local container index can contain a signature associated with each unique segment stored in the container, or alternatively can contain a shortened version of the signature of each unique segment stored in the container. Migration module 230 can look up the local location of the present segment S(j) using the signature of the present segment S(j), and can read the unique segment at that local location.

The process of FIG. 7 continues to operation 715, writing segment S(j) to a new container (M). The new container (M) can be in memory of a deduplicated server 140 that is accessible by migration module 230, such as a cache. The process continues to operation 720, determining if the new container (M) is full. If the new container (M) is full (e.g., has reached a maximum size or contains a maximum number of segments), the process continues to operation 725, writing the new container (M) to a new location in deduplicated data store 160 and updating the locations of the segments in the new container. Migration module 230 can update metadata for each migrated segment, such as by replacing a previous location identification (e.g., a container ID of the previous container that included the segment before migration) with a new location identification of the new container (e.g., a container ID of the new container that includes the segment after migration). Migration module 230 can also update the local container index of each container that previously contained a migrated segment, such as by removing a signature associated with the migrated segment from the local container index, or alternatively by removing a pointer from the local container index that pointed to the signature of the migrated segment. The process of FIG. 7 continues to operation 730, determining if another segment in the present chunk C(i) is left for migration.

Returning to operation 720, if the new container (M) is not full (e.g., has not reached a maximum size or a maximum number of segments), the process of FIG. 7 continues to operation 730, determining if another segment in the present chunk C(i) is left for migration. Migration module 230 can refer to the log of candidate chunks and/or the master list of segment-chunk associations to determine whether another segment is associated with the present chunk C(i) and has not yet been migrated. If another segment is left, the process continues to operation 745, incrementing j, and returning to operation 710 to migrate a next segment of the present chunk C(i). If another segment is not left, the process continues to operation 735, determining if another candidate chunk remains in the log. If another candidate chunk is left in the log, the process continues to operation 740, incrementing i, and returning to operation 705 to (possibly) defragment a next chunk in the log. If another candidate chunk is not left in the log, the process ends.

Figure 8:
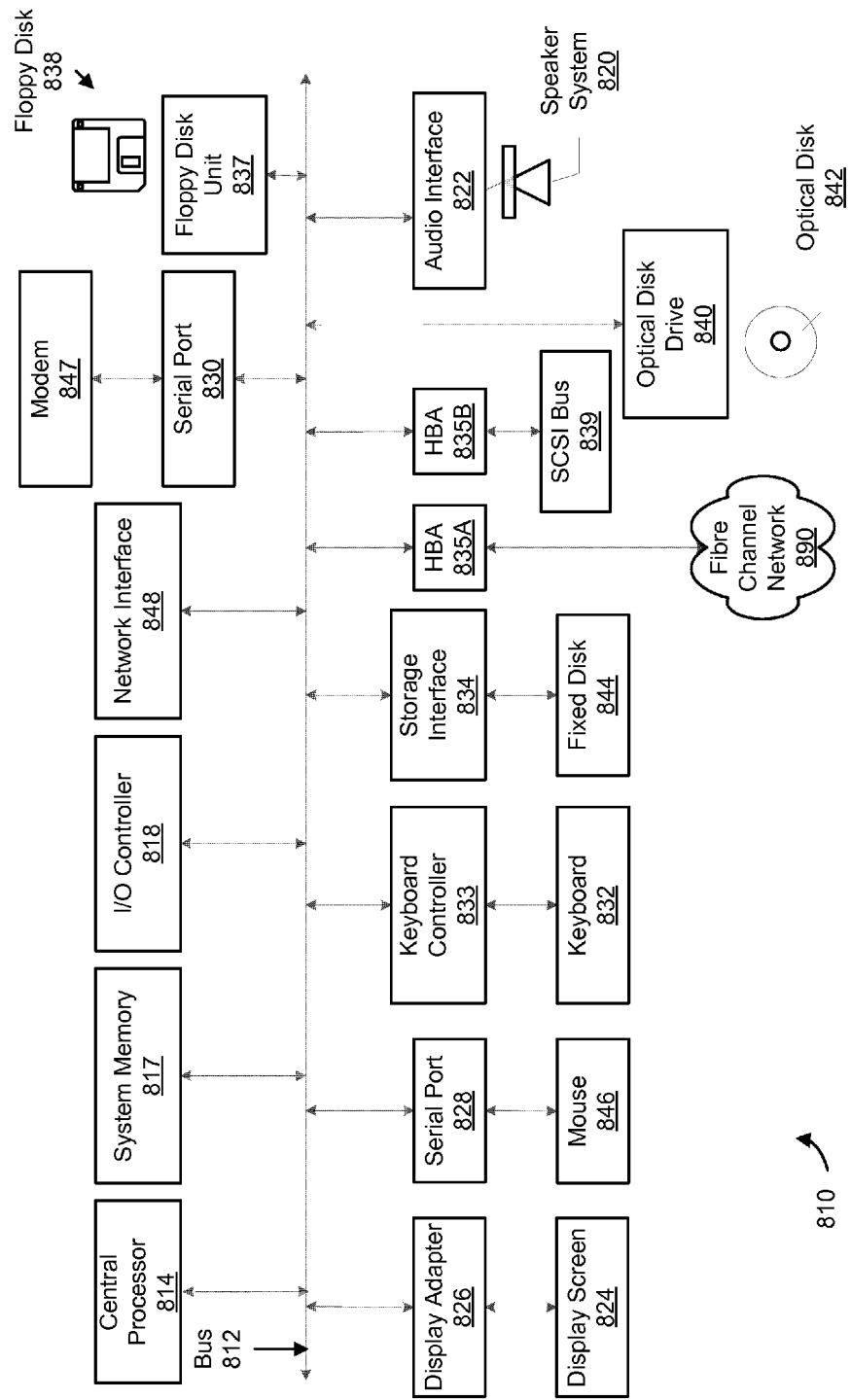
FIG. 8 is a simplified block diagram illustrating components of an example computer system suitable for implementing embodiments of the present disclosure, according to one embodiment.

FIG. 8 is a simplified block diagram that illustrates components of an example computer system 810 that is suitable for implementing the present disclosure. Computer system 810 may be illustrative of various computer systems in the deduplication system 100, such as system(s) 110, 130, and/or 140, among others. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code for the automatically performing operations on such applications based on their dependencies on other applications (such as described above with reference to the process of FIG. 5-7), etc., to implement the present disclosure can be stored in computer-readable storage media such as one or more of system memory 817, fixed disk 844, optical disk 842, or floppy disk 838. Memory 817 is also used for storing temporary variables or other intermediate information during the execution of instructions by the processor 814. The operating system provided on computer system 810 may be MS-DOS®, MS-WINDOWS®, OS/2®, UNIX®, Linux®, or another known operating system.

Moreover, regarding the signals described herein, it will be understood that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
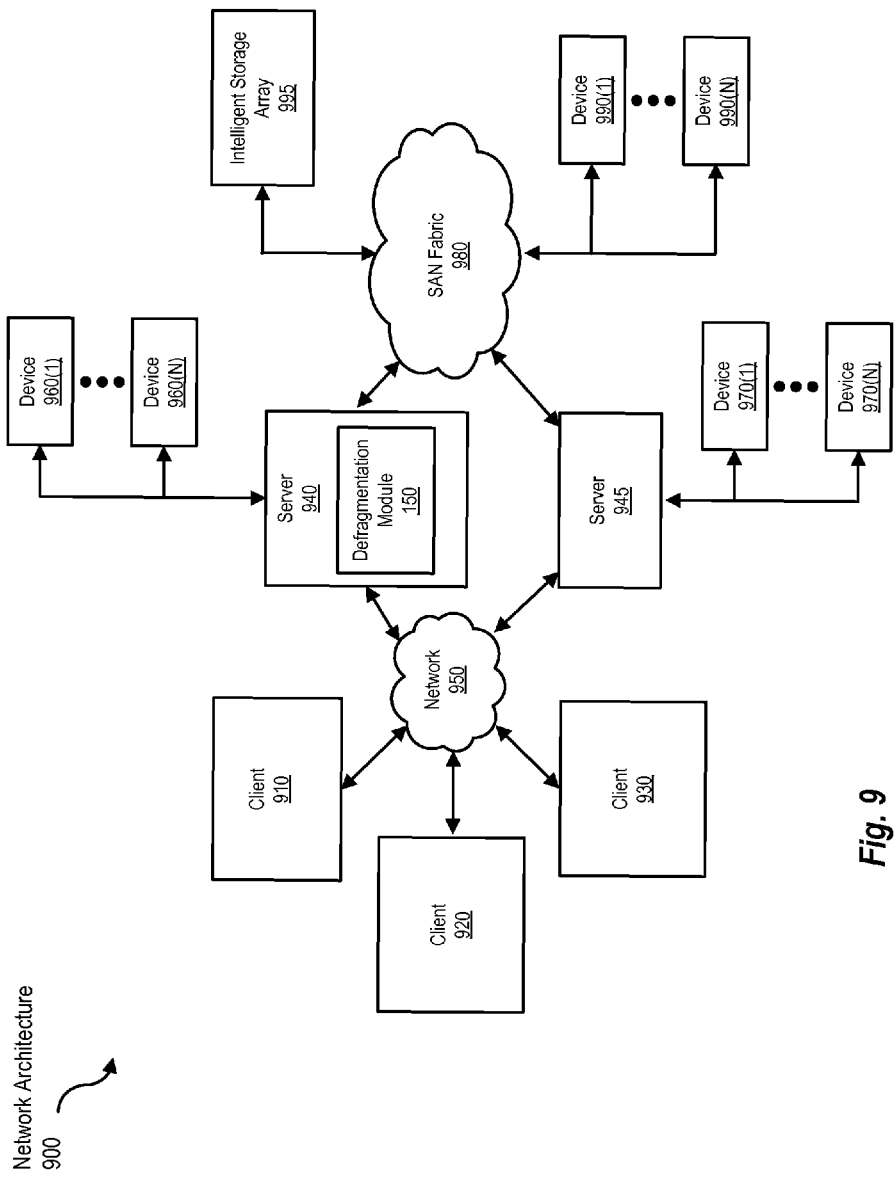
FIG. 9 is a simplified block diagram illustrating components of an example computer system suitable for implementing embodiments of the present disclosure, according to one embodiment.

FIG. 9 is a simplified block diagram illustrating components of an example computer system suitable for implementing embodiments of the present disclosure. FIG. 9 illustrates a network system 900 in which client systems 910, 920 and 930 and servers 940, and 945 can be coupled to a network 950. Client systems 910, 920 and 930 generally represent any type or form of computing device or system, such as client systems 110 in FIG. 1 or computer system 810 in FIG. 8.

Similarly, servers 940 and 945 generally represent computing devices or systems, such as application servers or database servers, configured to provide various database services and/or run certain software applications, such as servers 120 and 150 in FIG. 1 or computer system 810 in FIG. 8. Network 950 generally represents any telecommunication or computer network including, for example, an intranet, a wide area network (WAN), a local area network (LAN), a personal area network (PAN), or the Internet. In one example, client systems 910, 920 and/or 930 and/or servers 940, and/or 945 can include a defragmentation module 150, as shown in FIGS. 1 and 2.

As illustrated in FIG. 9, one or more storage devices 960(1)-(N) can be directly attached to server 940. Similarly, one or more storage devices 970(1)-(N) can be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) can represent network-attached storage (NAS) devices configured to communicate with servers 940 and 945 using various protocols, such as Network File System (NFS), Server Message Block (SMB), or Common Internet File System (CIFS).

Servers 940 and 945 can also be connected to a storage area network (SAN) fabric 980. SAN fabric 980 generally represents any type or form of computer network or architecture capable of facilitating communication between multiple storage devices. SAN fabric 980 can facilitate communication between servers 940 and 945 and a plurality of storage devices 990(1)-(N) and/or an intelligent storage array 995. SAN fabric 980 can also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computer system 810 of FIG. 8, a communication interface can be used to provide connectivity between each client system 920 and 930 and network 950. Client systems 910, 920 and 930 can be able to access information on server 940 or 945 using, for example, a web browser or other client software. Such software can allow client systems 910, 920 and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the embodiments disclosed herein can also be encoded as a computer program, stored in and run by server 940 and server 945, and distributed to client systems 910, 920 and 930 over network 950.

In some examples, all or a portion of the computing devices in FIGS. 1, 8, and 9 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a defragmentation module 150 in FIG. 1 can transform information received from a deduplication system into a new location for file segments.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining whether a chunk of deduplicated file data needs to be defragmented, wherein the chunk comprises a plurality of segments,
   the plurality of segments are stored in a first plurality of containers,
   the first plurality of containers comprises a first number of containers,
   the determining is based, at least in part, on the first number of containers a second number of containers, and a first total number of the plurality of segments,
   the determining comprises calculating a ratio of the first total number of the plurality of segments to the second number of containers, and
   the ratio is associated with the chunk; and
   in response to a determination that the chunk needs to be defragmented, migrating the plurality of segments from the first plurality of containers to a second plurality of containers, wherein
   the second plurality of containers comprises no more than the second number of containers, and
   the second number of containers is less than the first number of containers.

2. The method of claim 1, wherein the migrating comprises:
   reading the plurality of segments from the first plurality of containers; and
   contiguously writing the plurality of segments into the second plurality of containers.

3. The method of claim 2, wherein
   a first portion of segments of the plurality of segments are presently stored in the first plurality of containers,
   the first portion of segments are contiguously written into a first container of the second plurality of containers, and
   the first container is located in cache memory.

4. The method of claim 3, further comprising:
   writing the first container to data storage; and
   deleting the first portion of segments from the first plurality of containers.

5. The method of claim 1, further comprising:
   updating metadata about the plurality of segments, wherein
   a location associated with each segment of the plurality of segments is updated to include an identification of one of the second plurality of containers.

6. The method of claim 1, further comprising:
   determining that the ratio falls below a threshold value, wherein the ratio indicates that the chunk needs to be defragmented.

7. A computer program product comprising:
   a non-transitory computer readable medium storing program instructions executable by a processor, wherein the program instructions are configured to
   make a determination whether a chunk of deduplicated file data needs to be defragmented, wherein
   the chunk comprises a plurality of segments, the plurality of segments are stored in a first plurality of containers,
   the first plurality of containers comprises a first number of containers,
   the determination is based, at least in part, on the first number of containers, a second number of containers, and a first total number of the plurality of segments,
   the determining comprises calculating a ratio of the first total number of the plurality of segments to the second number of containers, and
   the ratio is associated with the chunk; and
   in response to a determination that the chunk needs to be defragmented, migrate the plurality of segments from the first plurality of containers to a second plurality of containers, wherein
   the second plurality of containers comprises no more than the second number of containers, and
   the second number of containers is less than the first number of containers.

8. The computer program product of claim 7, wherein the program instructions are further configured to
   read the plurality of segments from the first plurality of containers, and
   contiguously write the plurality of segments into the second plurality of containers.

9. The computer program product of claim 8, wherein
   a first portion of segments of the plurality of segments are presently stored in the first plurality of containers,
   the first portion of segments are contiguously written into a first container of the second plurality of containers, and
   the first container is located in cache memory.

10. The computer program product of claim 9, wherein the program instructions are further configured to
    write the first container to data storage, and
    delete the first portion of segments from the first plurality of containers.

11. The computer program product of claim 7, wherein the program instructions are further configured to update metadata about the plurality of segments, wherein
    a location associated with each segment of the plurality of segments is updated to include an identification of one of the second plurality of containers.

12. The computer program product of claim 7, wherein the program instructions are further configured to
    determine that the ratio falls below a threshold value, wherein
    the ratio indicates that the chunk needs to be defragmented.

13. A system comprising:
    a defragmentation module, wherein
    the defragmentation module is implemented on a server,
    the defragmentation module is communicatively coupled to a data store, and
    the defragmentation module is configured to make a determination whether a chunk of deduplicated file data needs to be defragmented, wherein
    the chunk is stored in the data store,
    the chunk comprises a plurality of segments,
    the plurality of segments are stored in a first plurality of containers,
    the first plurality of containers comprises a first number of containers,
    the determination is based, at least in part, on the first number of containers, a second number of containers, and a first total number of the plurality of segments, the determining comprises calculating a ratio of the
first total number of the plurality of segments to
the second number of containers, and
the ratio is associated with the chunk; and
in response to a determination that the chunk needs to
be defragmented, migrate the plurality of segments
from the first plurality of containers to a second
plurality of containers, wherein
the second plurality of containers comprises no more
than the second number of containers, and
the second number of containers is less than the first
number of containers.

14. The system of claim 13, wherein
the defragmentation module is further configured to
read the plurality of segments from the first plurality of
containers, and
contiguously write the plurality of segments into the
second plurality of containers.

15. The system of claim 14, wherein
a first portion of segments of the plurality of segments are
presently stored in the first plurality of containers,
the first portion of segments are contiguously written into
a first container of the second plurality of containers,
and
the first container is located in cache memory.

16. The system of claim 13, wherein
the defragmentation module is communicatively coupled
to a metadata store, and
the defragmentation module is further configured to
update metadata about the plurality of segments,
wherein
the metadata is stored in the metadata store,
a location associated with each segment of the plurality of segments is updated to include an identification of one of the second plurality of containers.

17. An apparatus comprising:
an analysis module configured to
make a determination whether a chunk of file data needs
to be defragmented, wherein the chunk comprises a
plurality of segments,
the plurality of segments are stored in a first plurality of
containers,
the first plurality of containers comprises a first number of
containers,
the determination is based, at least in part, on the first
number of containers, a second number of containers,
and a first total number of the plurality of segments,
making the determination comprises calculating a ratio of
the first total number of the plurality of segments to the
second number of containers, and
the ratio is associated with the chunk; and
a migration module configured to
in response to a determination that the chunk needs to be
defragmented, migrate the plurality of segments from
the first plurality of containers to a second plurality of
containers,
wherein
the second plurality of containers comprises no more than
the second number of containers, and
the second number of containers is less than the first
number of containers.

\* \* \* \* \*